(12) United States Patent
Maistre et al.

(10) Patent No.: US 11,852,199 B2
(45) Date of Patent: Dec. 26, 2023

(54) SYSTEM FOR CAPTURING RAILWAY DISC BRAKE PARTICLES WITH SEALING BUSHING AND RETURN MECHANISM

(71) Applicant: TALLANO TECHNOLOGIE, Boulogne Billancourt (FR)

(72) Inventors: Adrien Maistre, Boulogne Billancourt (FR); Loïc Adamczak, Boulogne Billancourt (FR)

(73) Assignee: TALLANO TECHNOLOGIES, Paris (FR)

( * ) Notice: Subject to any disclaimer, the term of this patent is extended or adjusted under 35 U.S.C. 154(b) by 437 days.

(21) Appl. No.: 17/291,460

(22) PCT Filed: Nov. 4, 2019

(86) PCT No.: PCT/FR2019/052608
§ 371 (c)(1),
(2) Date: May 5, 2021

(87) PCT Pub. No.: WO2020/094962
PCT Pub. Date: May 14, 2020

(65) Prior Publication Data
US 2022/0003291 A1 Jan. 6, 2022

(30) Foreign Application Priority Data
Nov. 8, 2018 (FR) ..................... 18 60320

(51) Int. Cl.
*F16D 69/04* (2006.01)
*F16D 65/097* (2006.01)
*F16D 65/00* (2006.01)

(52) U.S. Cl.
CPC ..... *F16D 69/0408* (2013.01); *F16D 65/0972* (2013.01); *F16D 65/0031* (2013.01); *F16D 2069/0441* (2013.01)

(58) Field of Classification Search
CPC ............. F16D 65/0972; F16D 65/0031; F16D 69/0408; B60T 5/00; B60T 17/043; B61H 5/00
See application file for complete search history.

(56) References Cited

U.S. PATENT DOCUMENTS

| 11,371,571 B2 * | 6/2022 | Rocca-Serra ....... F16D 65/0037 |
| 2015/0001013 A1 * | 1/2015 | Mennie ..................... B60T 5/00 188/73.1 |

(Continued)

FOREIGN PATENT DOCUMENTS

| CN | 201800690 U | 4/2011 |
| FR | 3 057 040 A1 | 4/2018 |

(Continued)

OTHER PUBLICATIONS

Office Action issued in Indian Patent Application No. 202147017492 dated May 25, 2022.

(Continued)

*Primary Examiner* — Vishal R Sahni
(74) *Attorney, Agent, or Firm* — NIXON & VANDERHYE

(57) ABSTRACT

Disclosed is a friction assembly for a railway disc brake system, this friction assembly including, on the one hand, a brake head including an upper face with a receiving slide, and a lower face, and on the other hand, shoe of friction material and including a first face which is the friction face, and a second face with a profile member configured to engage with the receiving slide, the shoe including a duct establishing sealed communication between a first space bordered by the first face and a second space bordered by the second face, the friction assembly further including a through-hole of central axis A, provided in the brake head and located in line with the duct, and a connection bushing in the through-hole and forming a connection with the duct.

(Continued)

The friction assembly includes a return mechanism capable of pressing the connection bushing against the profile member.

20 Claims, 5 Drawing Sheets

(56) References Cited

U.S. PATENT DOCUMENTS

| | | | |
|---|---|---|---|
| 2020/0049213 A1 | 2/2020 | Rocca-Serra | |
| 2022/0003291 A1 * | 1/2022 | Maistre | ............... B60T 17/043 |

FOREIGN PATENT DOCUMENTS

| | | | | |
|---|---|---|---|---|
| FR | 3057040 A1 * | 4/2018 | ............. | F16D 55/22 |
| GB | 2260173 A * | 4/1993 | ............. | F16D 65/02 |
| GB | 2515063 | 12/2014 | | |
| GB | 2515063 A * | 12/2014 | ............. | B60T 13/36 |
| JP | 2005-036829 | 2/2005 | | |
| JP | 2008-281060 | 11/2008 | | |
| WO | WO-2014199129 A1 * | 12/2014 | ............. | B60T 13/36 |
| WO | 2018/065541 | 4/2018 | | |
| WO | WO-2019025722 A1 * | 2/2019 | ................ | B60T 5/00 |

OTHER PUBLICATIONS

International Search Report and Written Opinion of the ISA for PCT/FR2019/052608, dated Mar. 11, 2020, 11 pages.

* cited by examiner

SYSTEM FOR CAPTURING RAILWAY DISC BRAKE PARTICLES WITH SEALING BUSHING AND RETURN MECHANISM

This application is the U.S. national phase of International Application No. PCT/FR2019/052608 filed 4 Nov. 2019, which designated the U.S. and claims priority to FR Patent Application No. 18 60320 filed 8 Nov. 2018, the entire contents of each of which are hereby incorporated by reference.

BACKGROUND OF THE INVENTION

Field of the Invention

This invention relates to the braking of railway rolling stock and in particular to the friction assemblies of the braking systems of railway rolling stock. Such rolling stock is understood to mean all vehicles configured to run on rails, such as trains, trams, and subways.

Description of the Related Art

The braking system generally includes a disc integral with a wheel or with an axle of the railway rolling stock. The braking system further includes a friction assembly which comprises a brake head which supports a friction shoe. The friction shoe usually comprises means of attachment to the brake head, and a friction pad. When a driver actuates the braking system, the friction pad of the friction shoe comes into contact with the disc in order to exert a braking force on the disc. Thus, by friction, the friction shoe brakes the disc integral with the wheel or axle. Generally, railway rolling stock have two friction assemblies, arranged one on each side of the disc so as to grip, or in other words sandwich, the disc in order to compress it on both sides.

The friction pad of the friction shoe usually comprises a metal material such as cast iron, a sintered material, or a composite material. When the friction pad of the friction shoe rubs against the disc, particles of material from the friction shoe and the disc are thus released into the ambient atmosphere around the friction assembly. The braking system thus emits atmospheric pollution in the form of more or less fine particles.

It has therefore been desirable to capture the particles of material emitted during braking, in particular by placing a suction device, supplied by a pump, near an area of emission of particles coming from the friction pad of the friction shoe.

One solution to solving this problem is the friction assembly illustrated in FIGS. 10 and 11, which represents the prior art.

FIG. 10 is a top view of this assembly, and FIG. 11 is a cross-section along line XI-XI of FIG. 10.

The brake head 103 extends longitudinally in a longitudinal direction Z, and transversely in a transverse direction X. The brake head 103 comprises, in the X-Z plane, an upper face intended to receive a friction shoe 102, and a lower face.

The axis perpendicular to these two faces and to the X-Z plane is a Y axis.

The brake head 103 has, on its upper face, a dovetailing concave receiving slide 105 which extends longitudinally from a first end of the brake head 103 to the vicinity of the second end of the brake head 103 where this slide does not extend through. The brake head 103 comprises, on the longitudinal axis Z, two through-holes 138 spaced apart from each other. Each through-hole 138 connects the lower face to the bottom of the slide 105 on the upper face.

The friction shoe 102 is in two identical parts, each part having a friction face 121 intended to be in frictional contact with the disc (not shown) of the vehicle and an opposite face 122. This opposite face 122 has a dovetailing convex profile member 104 configured to engage with the receiving slide 105. During use, a first part of the shoe 102 is inserted along the longitudinal axis Z by sliding the profile member 104 in the slide 105, until abutment against the slide 105. Then the second part of the shoe 102 is inserted along the longitudinal axis Z by sliding the profile member 104 in the slide 105, until abutment against the first part of the shoe 102, the contacting surfaces of the first part and the second part ideally being shaped to fit together over their entire surface.

Each of the parts of the shoe 102 comprises a duct 128 oriented along the Y axis. When these parts are fixed to the brake head 103, in use, each of the two ducts 128 is located facing a hole 138. The main axis of a duct 128 and of the hole 138 facing it is designated as the B axis, this duct 128 and this hole 138 therefore being coaxial. Each duct 128 thus forms, with one of the through-holes 138 provided in the brake head 103, a circuit which makes it possible to suction particles emitted by the friction shoe 102 during braking.

A connection bushing 108, consisting of a tube and a flange extending this tube radially outward at one of its ends, is mounted in the hole 138. The tube is inserted in the hole 138, the outside diameter of the tube being equal to the inside diameter of the hole 138 in order to ensure the best possible seal. The flange is housed in an annular housing of the brake head 103, this housing being centered on the main axis B and facing the opposite face 122 of the shoe 102. The flange is thus sandwiched between the profile member of the shoe 102 and the bottom of the slide 105 of the brake head 103. The depth of the annular housing (along the main axis B) is substantially equal to the thickness of the flange, such that once in its housing, the flange is in contact with both the brake head 103 and the face 122 of the profile member 104 of the shoe 102.

The connection bushing 108 completely traverses the brake head 103 and protrudes from it on its face opposite to the face provided with the slide 105. Onto this end of the tube of the bushing 108 is fixed a pipe 150 which is connected to a suction device (not shown) and which enables the suctioning, through the duct 128 and the hole 138, of the particles resulting from the braking of the railway vehicle.

The connection bushing 108 serves to guide the particles resulting from braking, from the duct 128 of the shoe 102 to the through-hole 138 of the brake head 3. The connection bushing 108 therefore aims to prevent possible leaks through the duct 128 and the hole 138. In particular, the connection bushing 108 aims to limit the amount of particles resulting from braking which could slip into the gap at the interface between the friction shoe 102 and the brake head 103, and especially to prevent air flow from the outside from entering the hole 138 through this gap, which would degrade the suctioning by the suction device.

A friction assembly is thus known for a railway disc brake system for railway rolling stock, this assembly comprising, on the one hand, a brake head comprising an upper face with a receiving slide, and a lower face, and on the other hand, at least one shoe of friction material comprising a first face which is the friction face, and a second face provided with a profile member configured to engage with the receiving slide, the shoe comprising at least one duct establishing sealed communication between a first space bordered by the first face and a second space bordered by the second face, this friction assembly further comprising at least one through-hole of central axis B, provided in the brake head and located in line with one of the at least one duct, and at least one connection bushing arranged in the at least one through-hole and forming a connection with the duct.

However, in use, such a friction assembly does not enable effectively preventing the passage of air at the interface between the shoe 102 and the brake head 103 at the duct 128 and the hole 138.

Indeed, the clearances at the interface between the brake head 103 and the shoe 102 prevent the connection bushing 108 from ensuring sufficient sealing with the shoe 102.

SUMMARY OF THE INVENTION

The present invention aims to remedy this disadvantage.

The invention aims to provide a friction assembly which makes it possible to more effectively suction the particles resulting from braking of the railway vehicle, at the same suction force.

This object is achieved due to the fact that the friction assembly comprises a return mechanism which is able to press the at least one connection bushing against the profile member.

By means of these arrangements, a seal is ensured between the connection bushing and the shoe, and consequently between the brake head and the shoe through the duct and the through-hole. This seal through the brake head and the shoe makes it possible to more effectively suction the particles resulting from the braking of the railway vehicle and emitted at the friction face (first face) of the shoe.

Advantageously, the return mechanism is a spring.

The return mechanism is thus simple to assemble into the friction assembly, and has excellent durability.

Advantageously, the connection bushing has a tube and a flange, the return mechanism being adapted to press the flange against the profile member.

A seal is thus ensured by contact between the entire surface of the flange and the surface of the profile member.

Advantageously, the connection bushing has a tube and a flange, and the spring is a coil spring with one end bearing on the flange and the other end on the brake head.

The mounting of the return mechanism in the friction assembly is thus facilitated.

Advantageously, the connection bushing has a tube and a conical flange, the flange acting as the return mechanism.

The use of an additional part as a return mechanism is thus unnecessary.

Advantageously, the connection bushing has a tube and a flange, and the lower face of the brake head is provided with a cap which together with the through-hole forms a chamber, and the return mechanism is a coil spring surrounding the tube and bearing on the flange at one end and on the inside face of the cap at the other end.

Advantageously, the radially outer periphery of the flange has a chamfer which extends along the surface of a cone of axis A.

Thus, when the profile member is slid in the slide, the profile member exerts a force on the chamfer which contributes to automatically pushing the sealing bushing (connection bushing) into the hole.

Advantageously, the shoe comprises two ducts, and the brake head comprises two through-holes, each of the ducts being in line with one of the two through-holes.

The suctioning of the particles is thus more efficient.

Advantageously, the connection bushing has a tube and a flange, the flange acting as the return mechanism, the tube being extended at its end opposite to the end carrying the flange by a plate which fits against the lower face of the brake head.

BRIEF DESCRIPTION OF THE DRAWINGS

The invention will be better understood and its advantages will be better apparent from reading the following detailed description of some embodiments shown as non-limiting examples. The description refers to the accompanying drawings, in which.

DESCRIPTION OF THE PREFERRED EMBODIMENTS

Figure 1:
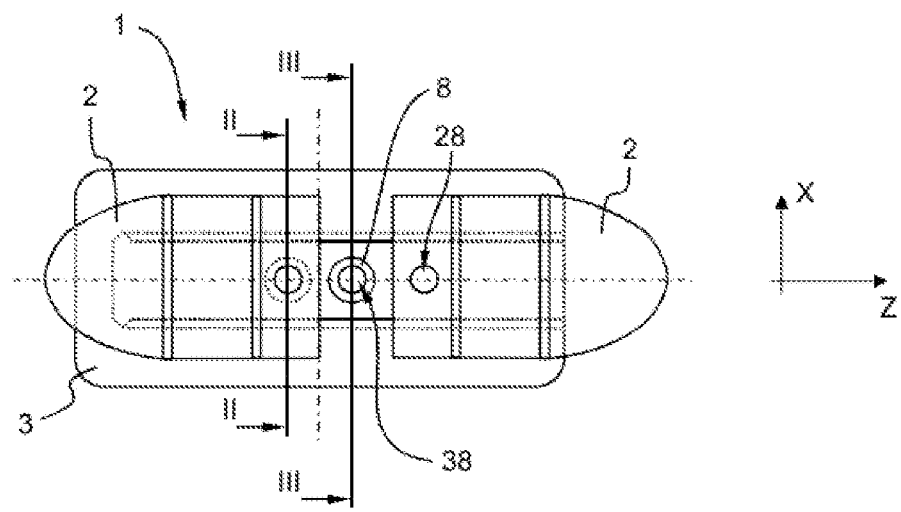
FIG. 1 is a top view of a friction assembly according to the invention.
Figure 2:
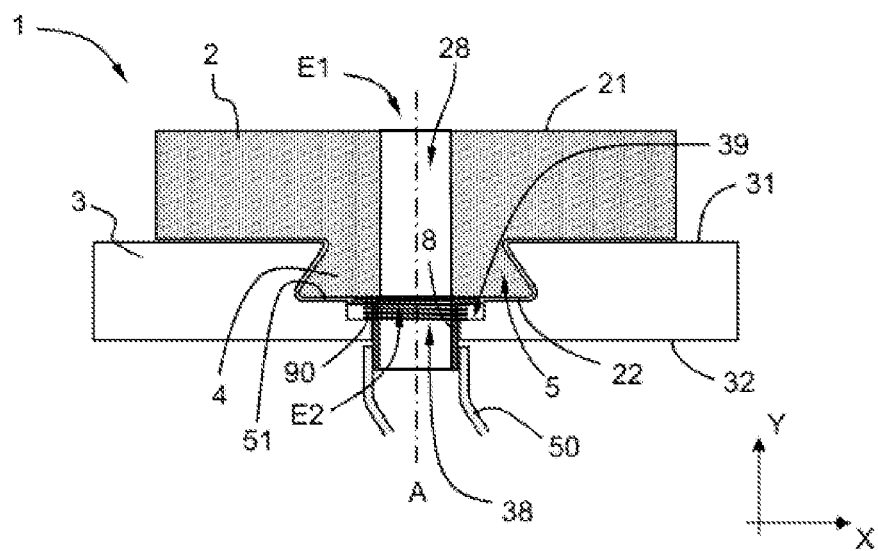
FIG. 2 is a cross-sectional view along line II-II of the friction assembly of FIG. 1.

FIG. 1 is a top view of a friction assembly 1 for a railway disc brake system for railway rolling stock, according to the invention, and FIG. 2 is a cross section along line II-II of FIG. 1.

This friction assembly 1 comprises a brake head 3 which extends in its largest direction in a longitudinal direction Z, and transversely in a transverse direction X. The brake head 3 thus extends mainly in the X-Z plane and comprises an upper face 31 intended to receive a friction shoe 2 and a lower face 32, which extend parallel to this plane.

The axis perpendicular to these two faces and to the X-Z plane is a Y axis.

The brake head 3 has, on its upper face 31, a dovetailing concave receiving slide 5 which extends longitudinally from a first end of the brake head 3 to the vicinity of the second end of the brake head 3 where this slide 5 does not extend through. The brake head 3 comprises, on the longitudinal axis Z, two through-holes 38 spaced apart from each other. Each through-hole 38 connects the lower face 32 to the bottom 51 of the slide 5.

This friction assembly 1 also comprises a friction shoe 2. This friction shoe 2 is in two substantially identical halves, where each half has a friction face (first face) 21 intended to be in frictional contact with the disc (not shown) of the vehicle and an opposite face 22 (second face). This opposite face 22 has a dovetailing convex profile member 4 configured to engage as tightly as possible with the receiving slide 5. This profile member 4 extends over the entire length (along the Z direction) of the half of the shoe 2.

The face of the profile member 4 which fits against the bottom 51 and sides of the slide 5 (when the profile member is inserted into this slide 5) is thus part of the opposite face 22.

Alternatively, the profile member 4 can have a different profile than a dovetail, and the slide 5 a different profile than a concave dovetail, provided that these two profile members are complementary and shaped to allow a relative sliding of the shoe 2 and the brake head 3 along the longitudinal axis Z and to prevent the shoe 2 from becoming detached from the brake head along the Y axis.

Advantageously, the region of the profile member 4 around each duct 28 and the region of the slide 5 around each hole 38 are planar in the X-Z plane and parallel.

During use, a first half of the shoe 2 is inserted along the longitudinal axis Z by sliding the profile member 4 in the slide 5, until abutment against the slide 5. Then the second half of the shoe 2 is inserted along the longitudinal axis Z by sliding the profile member 4 in the slide 5, until abutment against the first half of the shoe 2, the contacting surfaces of the first half and the second half ideally being shaped to fit together over their entire surface. The second face 22 of the friction shoe 2, with the dovetail 4, thus fits against the lower face 32 and the bottom 51 of the slide of the brake head 3.

Each of the halves of the shoe 2 comprises a duct 28 (also called "pneumatic duct") oriented along the Y axis.

This duct 28 establishes sealed communication between a first space E1 bordered by a first face 21 of the shoe 2 and a second space E2 bordered by a second face 22 of the friction shoe 2 opposite to said first face 21 and forming the face of the profile member 4.

When the two halves of the shoe 28 are fixed on the brake head 3, in use, each of the two ducts 28 is located facing one of the holes 38. The main axis of a duct 28 and of the hole 38 facing it is designated as the A axis, this duct 28 and this hole 38 therefore being coaxial (there are therefore two parallel main axes A, one for each set of a duct 28 and a hole 38). Each duct 28 thus forms, with one of the through-holes 38 provided in the brake head 3, a circuit which makes it possible to suction particles emitted by the friction shoe 2 during braking.

In the above description, the duct 28 and the hole 38 are coaxial with the main axis A.

Alternatively, if we consider axis A as the main axis of the hole 38, the duct 28 can be inclined relative to the axis A, starting from the interface between the hole 38 and the duct 28 (the orifice of the duct 28 at this interface is centered on axis A).

Thus, in all the embodiments described below with reference to the figures, alternatively the duct 28 may be inclined with respect to the axis A of the hole 38.

In all cases, the duct 28 and the hole 38 are in line with one another, which means that the orifice of the duct 28 at this interface fits with the hole 38, so that the duct 28 extends the hole 38.

The shoe 28 has been described above as being composed of two identical halves. Alternatively, the shoe 28 is one piece and of a shape and dimension identical to those of these two halves assembled side by side as during use. The single shoe 28 then comprises two ducts 28, or a single duct 28, or more than two ducts 28.

Figure 6:
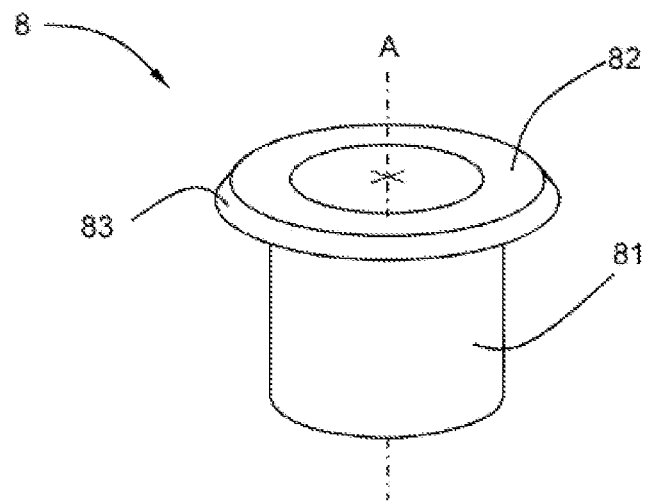
FIG. 6 is a perspective view of the connection bushing of the friction assembly of FIG. 1.

A connection bushing 8, consisting of a tube 81 and a flange 82 extending this tube 81, at one of its ends, radially outward and perpendicularly to the main axis A, is mounted in each of the holes 38. FIG. 6 is a perspective view of such a connection bushing 8.

The bushing 8 is therefore coaxial with the hole 38.

As illustrated in FIG. 2, the tube 81 of the connection bushing 8 completely traverses the brake head 3 and protrudes from it on its lower face 32. Onto this end of the tube 81 is fixed a pipe 50 which is connected to a suctioning mechanism (not shown). The pipe 50 enables the suctioning, through the duct 28 and the hole 38, of the particles resulting from the braking of the railway vehicle.

The connection bushing 8 serves to guide the particles resulting from braking, from the duct 28 of the shoe 2 to the through-hole 38 of the brake head 3.

At the face 22 having the dovetail 4, which is in contact with the bushing 8, the orifice of the duct 28 is in line with the hole of the tube 81 and centered on this tube 81.

Advantageously, as shown in FIG. 6, the radially outer periphery of the flange 82 has a chamfer 83. The chamfer 83 extends along the surface of a cone of central axis A, the flange 82 being located between the tip of this cone and the tube 81.

The advantage provided by this chamfer 83 is explained below.

The tube 81 is inserted in the hole 38, the outside diameter of the tube 81 being equal or substantially equal to the inside diameter of the hole 38 in order to ensure the best possible seal between the tube 81 and the wall of the hole 38, while allowing the tube 81 to slide along the main axis A relative to the brake head 3.

The flange 82 is housed in an annular housing 39 of the brake head 3. This housing 39 is a cavity in the bottom of the slide 5 and is centered on the main axis A. When the profile member 4 is in the slide 5, the housing 39 is opposite the face 22 of the profile member 4, as illustrated in FIG. 2.

In the housing 39, a return mechanism 90 is housed between the flange 82 and the bottom of the housing 39, which tends to move the flange 82 away from this bottom of the housing 39.

Figure 3:
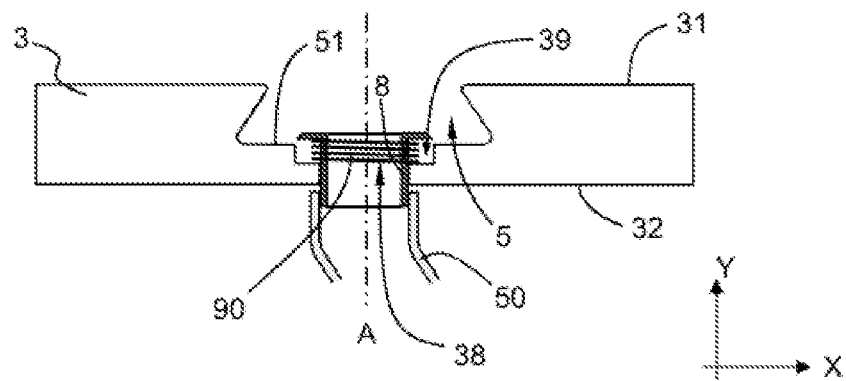
FIG. 3 is a cross-sectional view along line III-III of the friction assembly of FIG. 1.

For example, the return mechanism 90 is a coil spring which is centered on the main axis A. FIG. 3 shows this spring at rest. The flange 82, pushed upwards by the spring, then protrudes above the bottom of the slide 5.

When the friction shoe 2 is made integral with the brake head 3 by sliding the profile member 4 in the slide 5, the edge of the second face 22 of the shoe 2 (which is also the face of the profile member 4) comes into contact with a connection bushing 8. This edge then bears on the chamfer 83. Due to the incline of the chamfer 83 relative to the main axis A, the force exerted by the edge of the second face 22 on the chamfer 83, when the profile member 4 continues to be slid in the slide 5, automatically pushes the bushing 8 into the housing 39. The profile member 4 can then continue to slide in the slide 5, covering the bushing 8.

If the flange 82 does not have a chamfer 83, it is necessary to insert (for example manually) the bushing 8 into the housing 39 until the flange 82 no longer protrudes from the bottom of the slide 5, in order to be able to continue to slide the profile member 4 in the slide 5.

In all cases, once the profile member 4 covers the flange 82, the bushing 8 is kept inserted into the housing 39 by the profile member 4, such that the return mechanism 90 is compressed and presses the flange 82 against the profile member 4. The seal between the duct 28 and the hole 38, in other words between the shoe 2 and the brake head 3, is thus ensured.

The connection bushing 8 thus prevents possible leaks through the duct 28 and the hole 38. In particular, the connection bushing 8 makes it possible to reduce the amount of particles resulting from braking that are likely to slip into the gap at the interface between the friction shoe 2 and the brake head 3. Above all, the connection bushing 8 all makes it possible to prevent air from entering through this gap into the hole 38, which would reduce the efficiency of the suctioning by the suction device.

This situation is illustrated in FIGS. 2 and 3 for the case where the return mechanism 90 is a coil spring.

The return mechanism 90 may be of any type, provided that it presses the flange 82 against the profile member 4 when the profile member 4 is covering the flange 82.

Figure 4:
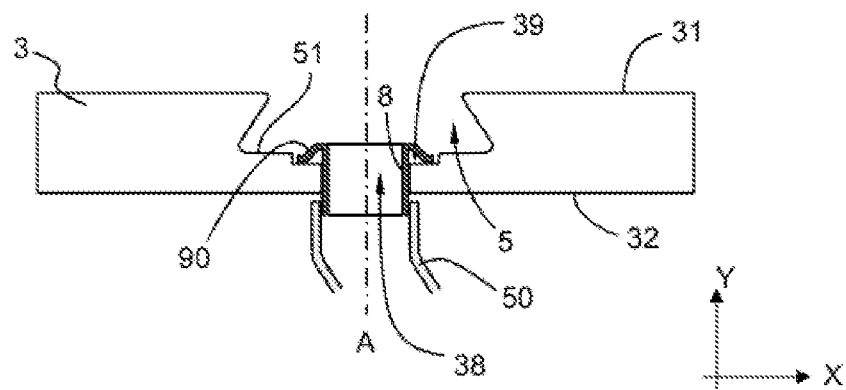
FIG. 4 is a cross-sectional view of the shoe and the connection bushing according to another embodiment of the friction assembly.

For example, the return mechanism 90 is the flange 82, which is shaped as an annular spring ("Belleville washer" type) as illustrated in FIG. 4.

The flange 82 thus extends from the end of the tube 81, substantially along the surface of a cone of central axis A, the tube 81 being located within the space defined by this cone.

In FIG. 4 the flange 82 is at rest. The proximal end of the flange 82 (where it meets the tube 81) is protruding from the bottom of the slide 5. The distal end of the flange 82 is in contact with the bottom of the housing 39.

When the flange 82 is pressed on (manually or by translational movement of the profile member 4 in the slide 5), the flange is deformed in flexion to flatten and become fully housed in the housing 39. The flange 82 resists this deformation and is therefore then pressed against the profile member 4.

Figure 5:
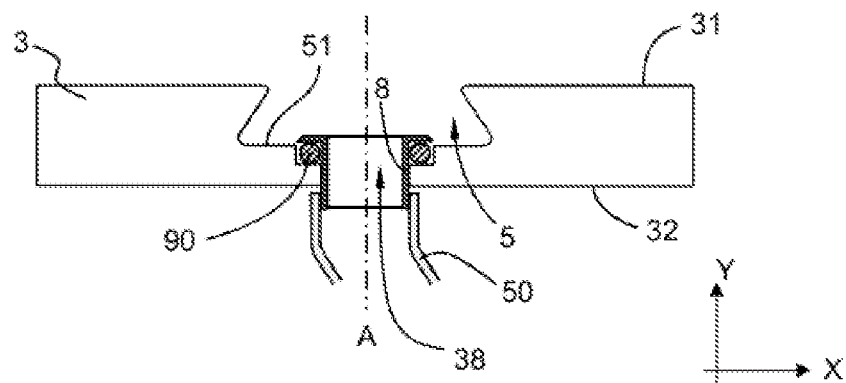
FIG. 5 is a cross-sectional view of the shoe and the connection bushing according to yet another embodiment of the friction assembly.

Alternatively, the flange 82 is flat (as in the previous embodiment in FIGS. 2 and 3), and the return mechanism 90 is an elastic O-ring seal which is housed in the housing 39 between the flange 82 and the bottom of the housing 39. FIG. 5 shows this seal at rest. The flange 82, pushed upwards by the seal, then protrudes above the bottom of the slide 5.

When the flange 82 is pressed on (manually or by translational movement of the profile member 4 in the slide 5), the seal compresses and resists this compression and the flange 82 is therefore then pressed against the profile member 4.

Figure 7:
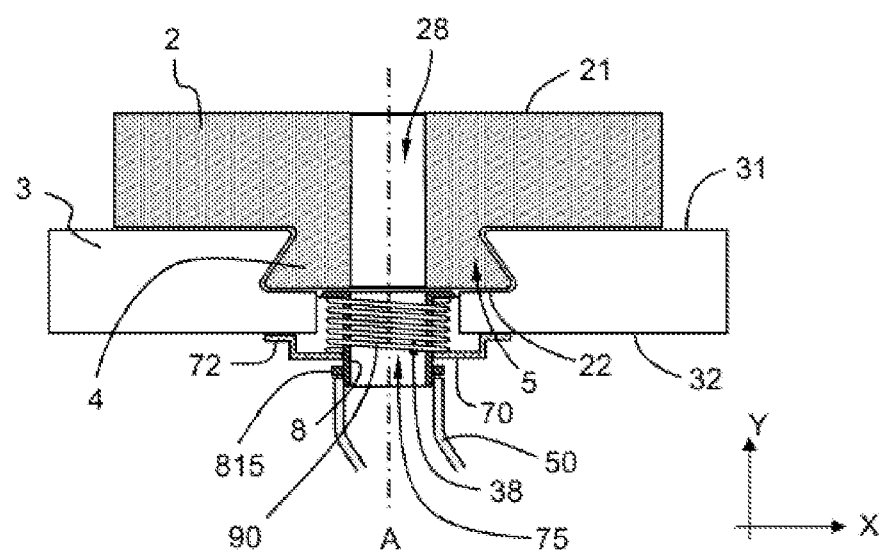
FIG. 7 is a cross-sectional view of the shoe and the connection bushing according to yet another embodiment of the friction assembly.

FIG. 7 illustrates another embodiment of the invention.

The lower face 32 of the brake head 3 is provided with an annular cap 70 centered on the central axis A. The cap 70 is thus provided with a central orifice 75 at its center. The radially outer edge 72 of this cap 70 is fixed to the lower face 32. The tube 81 passes through the orifice 75, of which the diameter is equal to the outside diameter of the tube 81 so as to establish a seal between the tube 81 and the cap 70.

The return mechanism 90 is a coil spring which is centered on the main axis A, one end bearing on the flange 82 (which is flat) and the other end bearing on the cap 70 so that the spring tends to push the flange 82 upwards and cause it to protrude above the bottom of the slide 5.

The tube 81 has a radial protuberance 815 on its outer face, which abuts against the cap 70 to prevent the tube 81 from sliding out of the cap 70 under the action of the spring.

Alternatively, the tube 81 is long enough so that, when the spring is at rest, the tube 81 is still in contact with the cap 70 and protrudes below the cap 70 to allow attachment of the pipe 50 to the end of the tube 81.

FIG. 7 shows the spring in compression, in the configuration where the profile member 4 is inserted into the slide 5 above the hole 38. The spring is then pressing the flange 82 against the profile member 4.

In all embodiments of the invention, such as those described above, the dimensions (and in particular the diameter) of the flange 82 are chosen so that, once the profile member 4 is inserted into the slide 5 above the hole 38, the flange 82 is in contact with the inner face of the hole 38, or of the housing 39 where applicable. This contributes to the general sealing between the hole 38 and the duct 28.

Advantageously, the space defined by the through-hole 38 and the cap 70 constitutes a chamber, and when the bushing 8 is held against the profile member 4, this chamber is sealed with the only orifices being those of the tube 81. This contributes to the general sealing between the hole 38 and the duct 28.

The cap 70 has been described above as covering a single hole 38. Alternatively, in the case where the brake head comprises two holes 38, the cap 70 may have an oblong shape in order to cover the two holes. In a first variant, the geometry of the cap 70 around each of the holes 38, and the geometry of each bushing 8, are as illustrated in FIG. 7. The cap 70 therefore has two orifices 75, each traversed by a bushing 8.

In a second variant, the cap 70 has a single orifice 75 onto which the pipe 50 is fixed. Each of the two bushings 8 (one per hole 38) then opens into the oblong chamber defined by the cap 70. The cap 70 then has two internal protuberances on which each spring 90 rests, these protuberances also serving to limit the travel (upward in the figures) of the spring 90.

Figure 8:
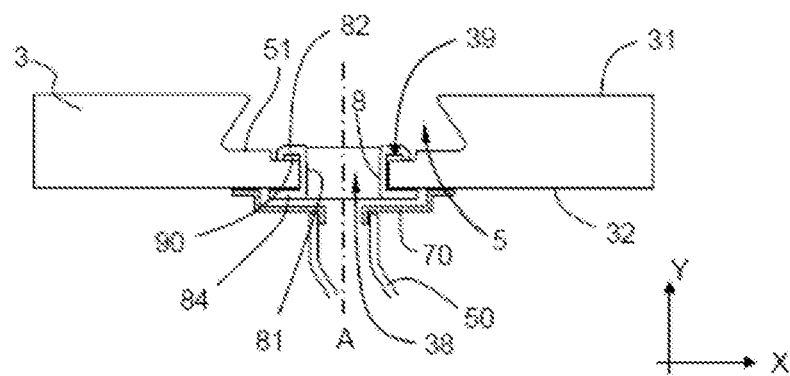
FIG. 8 is a cross-sectional view of the shoe and the connection bushing according to yet another embodiment of the friction assembly.

FIG. 8 illustrates another embodiment of the invention.

The connection bushing 8 has a tube 81 and a flange 82. The flange 82 is shaped to act as the return mechanism 90. The flange 82 thus has a lip at its radially outer end, which folds back towards the tube 81. When the shoe 2 presses on the bushing 8 along axis A, the lip deforms in order to fill the housing 39, thus ensuring the seal with the shoe 2.

The tube 81 is extended at its end opposite to the end carrying the flange 82 by a plate 84 which fits against the lower face 32 of the brake head 3. When the tube 81 is housed in the hole 38, the plate 84 is thus bearing against the lower face 32. The advantage of this configuration is that the sealing between the brake head 3 and the shoe 2 is achieved in a simple manner by insertion of the tube 81 and the flange 82 into the hole 83, without the need to use a separate return mechanism.

In addition, the bushing 8 is held in place in the hole 38 by means of the plate 84.

The lower face 32 of the brake head 3 is provided with a cap 70 which is fixed to this lower face 32 and which surrounds the plate 84. The cap 70 is provided with an orifice on which the pipe 50 is fixed in a sealed manner. The cap 70 thus defines a chamber.

Figure 9:
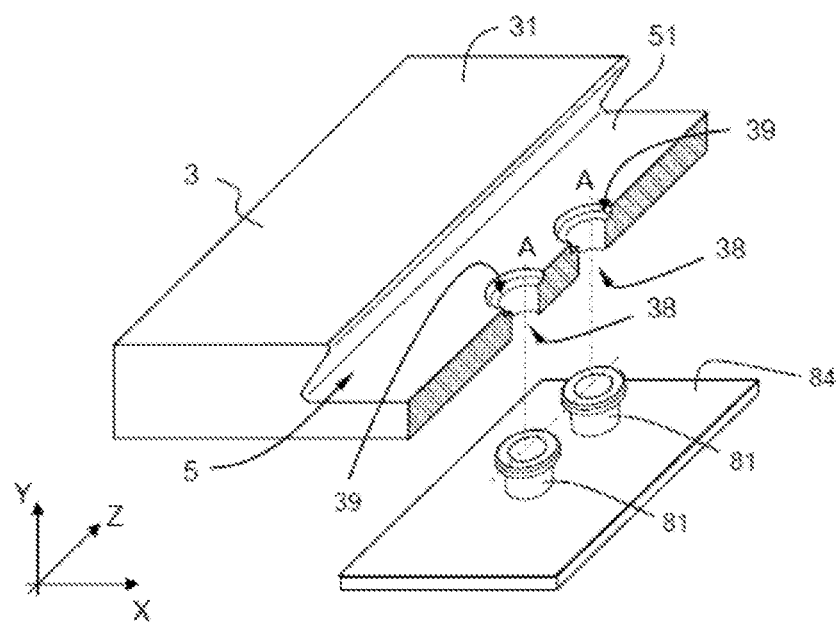
FIG. 9 is a perspective view of the shoe and the connection bushing in a variant of the embodiment of the friction assembly illustrated in FIG. 8.
Figure 10:
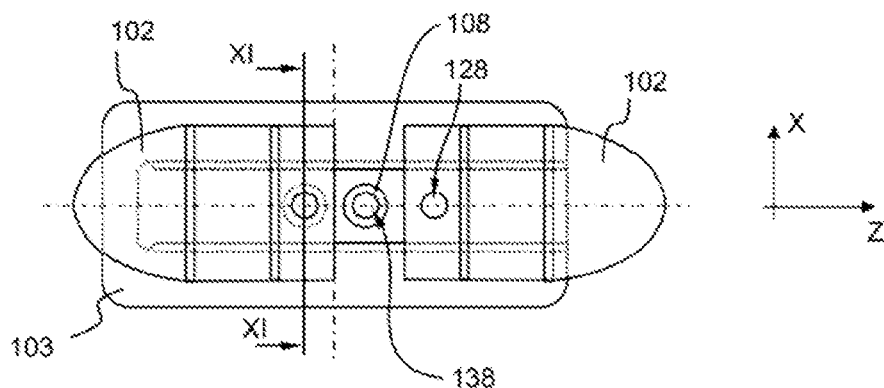
FIG. 10, already described, is a top view of a friction assembly according to the prior art.
Figure 11:
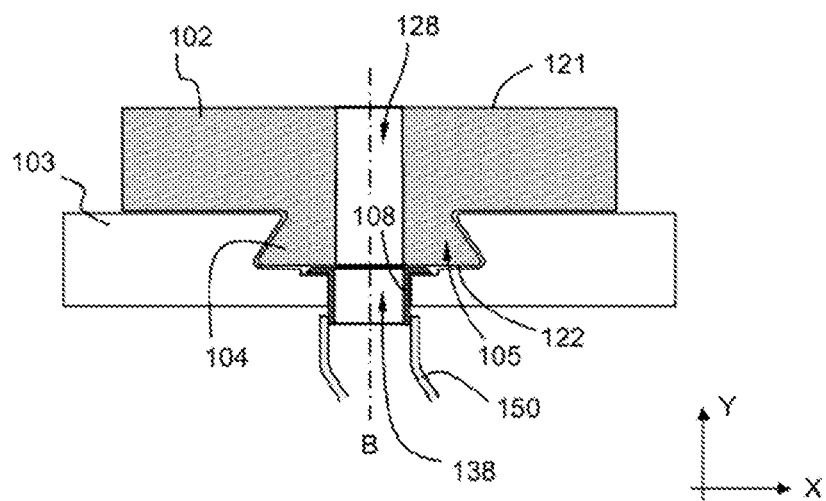
FIG. 11, already described, is a cross-sectional view along line XI-XI of the friction assembly of FIG. 10.

FIG. 9 illustrates an alternative embodiment of the friction assembly of FIG. 8.

The plate 84, instead of carrying a single connection bushing 8, carries two connection bushings 8. The tube 81 of each of the bushings 8 is thus extended, at its end opposite to the end carrying the flange 82, by the plate 84.

The shoe 3 is represented in perspective and in a longitudinal section (in the vertical plane Y-Z) through its middle, in other words through the middle of the slide 5. The assembly of the plate 84 and the connection bushings 8 is represented in exploded perspective. The two bushings 8 are intended to be inserted into the holes 38 along the main axes A, in the direction of the vertical axis Y.

The advantage of this variant is that with a single assembly consisting of the plate 84 and the connection bushings 8, it is possible to achieve the sealing between the entire brake head 3 and the entire shoe or shoes 2.

The plate 84 may carry two bushings 8 or more, depending on the total number of holes 38 in the brake head 3.

According to another embodiment, the return mechanism 90 which presses the bushing 8 against the profile member 4 is achieved by two elements which attract each other from a distance.

For example, this attraction is magnetic. The flange 82 of the bushing 8 thus comprises an annular magnet (or a plurality of magnets distributed along its circumference) which constitutes the first of the two elements. The region of the second face 22 of the profile member 4 around the duct 28 constitutes the second of the two elements when the profile member is made of steel. Thus, when the profile member 4 is inserted into the slide 5 above the hole 38, the magnetic field of attraction between the magnet of the flange 82 and the profile member 4 presses the flange 82 against the profile member 4. If the profile member 4 is made of a material which is not ferromagnetic, an annular magnet is inserted around the duct 28, this magnet then constituting the second of the two elements.

The invention claimed is:

1. Friction assembly (1) for a railway disc brake system for railway rolling stock, said friction assembly (1) comprising both a brake head (3) comprising an upper face (31) with a receiving slide (5), and a lower face (32), as well as at least one shoe (2) of friction material and comprising a first face (21) which is the friction face, and a second face (22) provided with a profile member (4) configured to engage with the receiving slide (5), said shoe (2) comprising at least one duct (28) establishing sealed communication between a first space (E1) bordered by said first face (21) and a second space (E2) bordered by said second face (22), said friction assembly (1) further comprising at least one through-hole (38) of central axis A, provided in the brake head (3) and located in line with one of said at least one duct (28), and at least one connection bushing (8) arranged in said at least one through-hole (38) and forming a connection with said at least one duct (28), said friction assembly (1) comprising a return mechanism (90) which is able to press said at least one connection bushing (8) against said profile member (4).

2. The friction assembly (1) according to claim 1, wherein said return mechanism (90) is a spring.

3. The friction assembly (1) according to claim 1, wherein said connection bushing (8) has a tube (81) and a flange (82), said return mechanism (90) being adapted to press said flange (82) against said profile member (4).

4. The friction assembly (1) according to claim 2, wherein said bushing (8) has a tube (81) and a flange (82), and said spring is a coil spring with one end bearing on said flange (82) and the other end on said brake head (3).

5. The friction assembly (1) according to claim 3, wherein said bushing (8) has a tube (81) and a conical flange (82), said flange (82) acting as said return mechanism (90).

6. The friction assembly (1) according to claim 2, wherein said bushing (8) has a tube (81) and a flange (82), said lower face (32) of the brake head (3) is provided with a cap (70) which together with said through-hole (38) forms a chamber, and said return mechanism (90) is a coil spring surrounding the tube (81) and bearing on said flange (82) at one end and on the inside face of said cap (70) at the other end.

7. The friction assembly (1) according to claim 3, wherein the radially outer periphery of said flange (82) has a chamfer (83) which extends along the surface of a cone of central axis A.

8. The friction assembly (1) according to preceding claim 1, wherein said shoe (2) comprises two ducts (28), and said brake head (3) comprises two through-holes (38), each of said ducts (28) being in line with one of the two through-holes (38).

9. The friction assembly according to claim 1, wherein said connection bushing (8) has a tube (81) and a flange (82), said flange (82) acting as said return mechanism (90), said tube (81) being extended at an end opposite to the end carrying said flange (82) by a plate (84) which fits against said lower face (32) of the brake head (3).

10. The friction assembly (1) according to claim 2, wherein said connection bushing (8) has a tube (81) and a flange (82), said return mechanism (90) being adapted to press said flange (82) against said profile member (4).

11. The friction assembly (1) according to claim 10, wherein said bushing (8) has a tube (81) and a conical flange (82), said flange (82) acting as said return mechanism (90).

12. The friction assembly (1) according to claim 3, wherein said bushing (8) has a tube (81) and a flange (82), said lower face (32) of the brake head (3) is provided with a cap (70) which together with said through-hole (38) forms a chamber, and said return mechanism (90) is a coil spring surrounding the tube (81) and bearing on said flange (82) at one end and on the inside face of said cap (70) at the other end.

13. The friction assembly (1) according to claim 4, wherein the radially outer periphery of said flange (82) has a chamfer (83) which extends along the surface of a cone of central axis A.

14. The friction assembly (1) according to claim 5, wherein the radially outer periphery of said flange (82) has a chamfer (83) which extends along the surface of a cone of central axis A.

15. The friction assembly (1) according to claim 6, wherein the radially outer periphery of said flange (82) has a chamfer (83) which extends along the surface of a cone of central axis A.

16. The friction assembly (1) according to claim 2, wherein said shoe (2) comprises two ducts (28), and said brake head (3) comprises two through-holes (38), each of said ducts (28) being in line with one of the two through-holes (38).

17. The friction assembly (1) according to claim 3, wherein said shoe (2) comprises two ducts (28), and said brake head (3) comprises two through-holes (38), each of said ducts (28) being in line with one of the two through-holes (38).

18. The friction assembly (1) according to claim 4, wherein said shoe (2) comprises two ducts (28), and said brake head (3) comprises two through-holes (38), each of said ducts (28) being in line with one of the two through-holes (38).

19. The friction assembly (1) according to claim 5, wherein said shoe (2) comprises two ducts (28), and said brake head (3) comprises two through-holes (38), each of said ducts (28) being in line with one of the two through-holes (38).

20. The friction assembly (1) according to claim 6, wherein said shoe (2) comprises two ducts (28), and said brake head (3) comprises two through-holes (38), each of said ducts (28) being in line with one of the two through-holes (38).

\* \* \* \* \*